US009623930B2

(12) United States Patent
Desberg

(10) Patent No.: US 9,623,930 B2
(45) Date of Patent: Apr. 18, 2017

(54) SCOOTER WITH MOVABLE PORTION

(71) Applicant: RAZOR USA LLC, Cerritos, CA (US)

(72) Inventor: Ian Desberg, Cerritos, CA (US)

(73) Assignee: RAZOR USA LLC, Cerritos, CA (US)

(*) Notice: Subject to any disclaimer, the term of this patent is extended or adjusted under 35 U.S.C. 154(b) by 0 days.

(21) Appl. No.: 14/872,721

(22) Filed: Oct. 1, 2015

(65) Prior Publication Data

US 2016/0096577 A1 Apr. 7, 2016

Related U.S. Application Data

(60) Provisional application No. 62/059,718, filed on Oct. 3, 2014.

(51) Int. Cl.

*B62K 9/00* (2006.01)
*B62K 19/00* (2006.01)
*B62K 3/00* (2006.01)
*B62K 9/02* (2006.01)
*A63G 19/00* (2006.01)

(52) U.S. Cl.

CPC .............. *B62K 19/00* (2013.01); *B62K 3/002* (2013.01); *B62K 9/00* (2013.01); *B62K 9/02* (2013.01); *A63G 19/00* (2013.01)

(58) Field of Classification Search

CPC . B62K 9/02; B62K 9/00; B62K 3/002; B62K 2202/00; B62K 2700/56; A63C 17/01; A63C 17/011; A63C 17/013; A63C 17/26; A63C 17/265; A63C 2203/08

See application file for complete search history.

(56) References Cited

U.S. PATENT DOCUMENTS

| | | | | | |
|---|---|---|---|---|---|
| 757,834 | A * | 4/1904 | Patten | A63H 7/04 | 446/287 |
| 862,015 | A * | 7/1907 | Pittman | A63H 7/06 | 280/1.201 |
| 1,223,372 | A * | 4/1917 | Zerega | A63H 7/04 | 446/292 |
| 1,447,953 | A * | 3/1923 | Herschmann | A63G 19/02 | 280/1.14 |
| 1,472,498 | A | 10/1923 | Shubert | | |
| 1,483,033 | A | 2/1924 | Wisman | | |
| 1,499,884 | A | 7/1924 | Singer | | |
| 2,201,440 | A * | 5/1940 | Letourneau | B62K 9/02 | 280/264 |

(Continued)

FOREIGN PATENT DOCUMENTS

DE 20007052 9/2000

OTHER PUBLICATIONS

International Search Report and Written Opinion for international application No. PCT/US2015/05397 dated Dec. 11, 2015.

*Primary Examiner* — Emma K Frick
(74) *Attorney, Agent, or Firm* — Knobbe, Martens, Olson & Bear, LLP

(57) ABSTRACT

A personal mobility vehicle, such as a scooter, includes a plurality of wheels supporting a deck or other vehicle body portion. The vehicle has a movable portion that is movable relative to another portion of the vehicle. A motion transfer mechanism is operably coupled to the movable portion and causes movement of the movable portion in response to movement of the vehicle.

21 Claims, 13 Drawing Sheets

100

130

(56) References Cited

U.S. PATENT DOCUMENTS 2,512,533 A * 6/1950 Savage .................... A63H 7/04 280/827
4,244,592 A * 1/1981 Lohr ........................ B62K 9/00 280/1.165
4,261,588 A * 4/1981 Kassai ..................... B62K 9/00 280/272
4,264,080 A * 4/1981 Kassai ..................... B62K 9/00 280/1.13
4,424,978 A * 1/1984 Kassai ..................... B62K 9/00 280/1.13
4,568,307 A * 2/1986 Gabler ..................... A63H 7/04 446/292
D295,208 S 4/1988 Vallejo
5,334,078 A * 8/1994 Hippely ................. A63H 17/26 446/275
5,626,506 A * 5/1997 Halford ................ A63H 33/003 446/465
D552,186 S * 10/2007 Hong ........................... D21/423
D552,187 S * 10/2007 Hong ........................... D21/423
7,722,430 B2 * 5/2010 Hippely ................. A63H 29/04 446/431
D638,486 S 5/2011 Scolari et al.
D638,494 S 5/2011 Scolari et al.
7,988,524 B2 * 8/2011 Sitarski .................... B62K 9/00 446/470
D665,034 S * 8/2012 Grossman .................... D21/423
8,469,374 B2 * 6/2013 Graf Von Bismarck ............... A45C 5/146 280/30
8,733,769 B1 * 5/2014 Rogers ................... A63C 17/01 280/87.042
9,162,724 B2 * 10/2015 Desberg ................. A63G 17/00
2006/0001227 A1 * 1/2006 Hong ..................... B62K 3/002 280/87.041
2006/0066066 A1 * 3/2006 Lim ....................... B62K 3/002 280/87.041
2015/0114167 A1 * 4/2015 Desberg ................. B62K 21/26 74/551.9

* cited by examiner

SCOOTER WITH MOVABLE PORTION

CROSS REFERENCE

This application claims the priority benefit under 35 U.S.C. §119 of U.S. Patent Application No. 62/059,718, filed on Oct. 3, 2014, the entirety of which hereby incorporated by reference. Additionally, any applications for which a foreign or domestic priority claim is identified in the Application Data Sheet as filed with the present application are hereby incorporated by reference in their entirety.

BACKGROUND

Field

The present disclosure relates to personal mobility vehicles, such as kick-scooters. In particular, the present disclosure relates to a personal mobility vehicle having a movable portion that moves in response to motion of the vehicle.

Description of the Related Art

Many types of personal mobility vehicles, including skateboards, kick-scooters, powered scooters, bicycles, karts, etc., exist.

SUMMARY

However, a need still exists for new and/or improved designs, which may provide a new riding experience or unique functionality. The systems, methods and devices described herein have innovative aspects, no single one of which is indispensable or solely responsible for their desirable attributes. Without limiting the scope of the claims, some of the advantageous features will now be summarized.

In some configurations, a personal mobility vehicle, such as a scooter, includes a plurality of wheels supporting a deck or other vehicle body portion. The vehicle has a movable portion that is movable (e.g., partially rotatable) relative to another portion of the vehicle. A motion transfer mechanism is operably coupled to the movable portion and causes movement of the movable portion in response to movement of the vehicle. In some configurations, the motion transfer mechanism is coupled to one or more of the wheels.

In some configurations, the vehicle comprises a character portion and the movable portion comprises a movable portion of the character portion. The character portion can be a head. The movable portion can be a portion above or below a mouth of the character head, such that movement of the movable portion provides the appearance of the character head opening and closing its mouth.

In some configurations, the motion transfer mechanism comprises a wheel drive shaft coupled to the wheel and a motion conversion mechanism that couples the wheel drive shaft to the movable portion. The mechanism can comprise a cam that drives a push rod, which moves the movable portion.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings.

DETAILED DESCRIPTION

Figure 1:
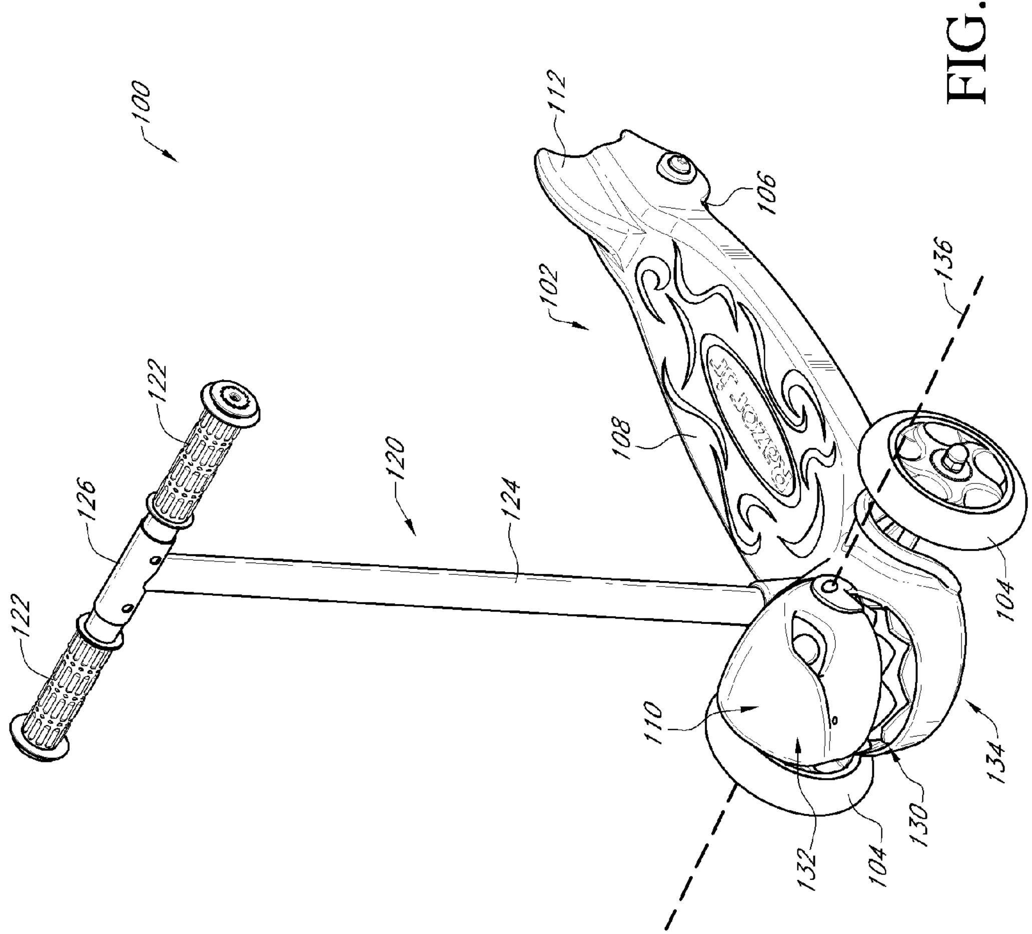
FIG. 1 is perspective view showing a front, side and top surface of a scooter.
Figure 2:
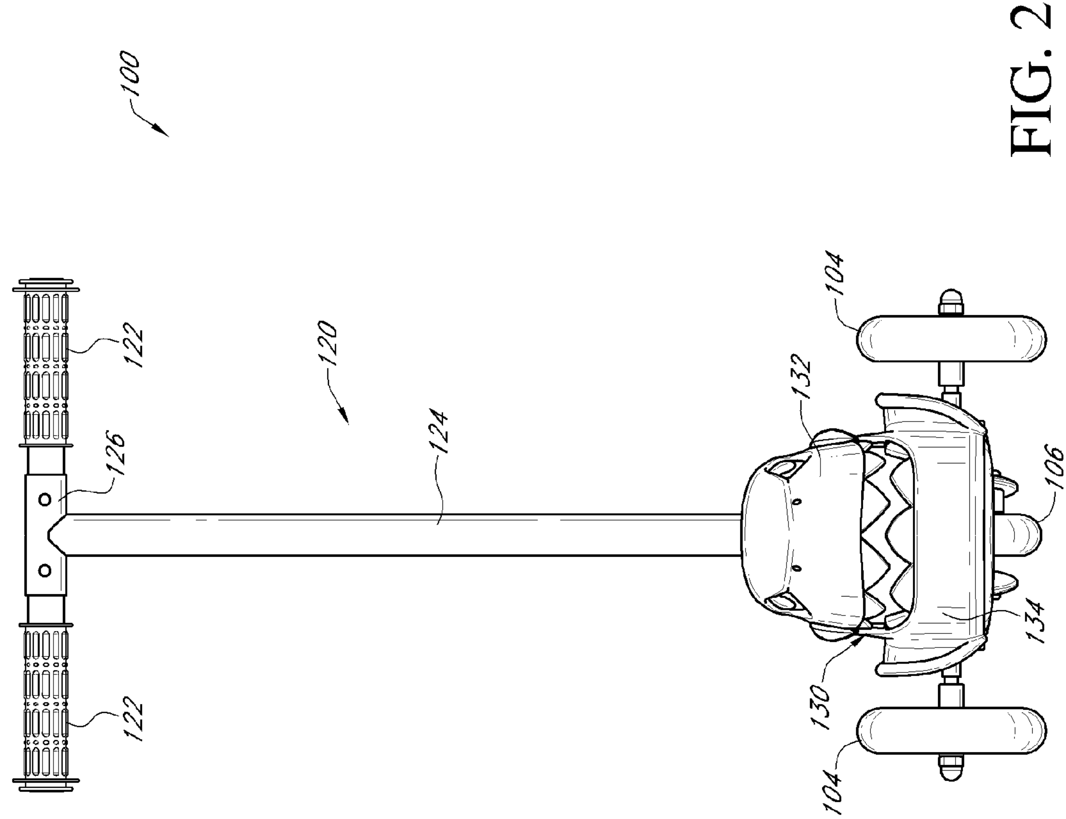
FIG. 2 is a front view of the scooter of FIG. 1.
Figure 3:
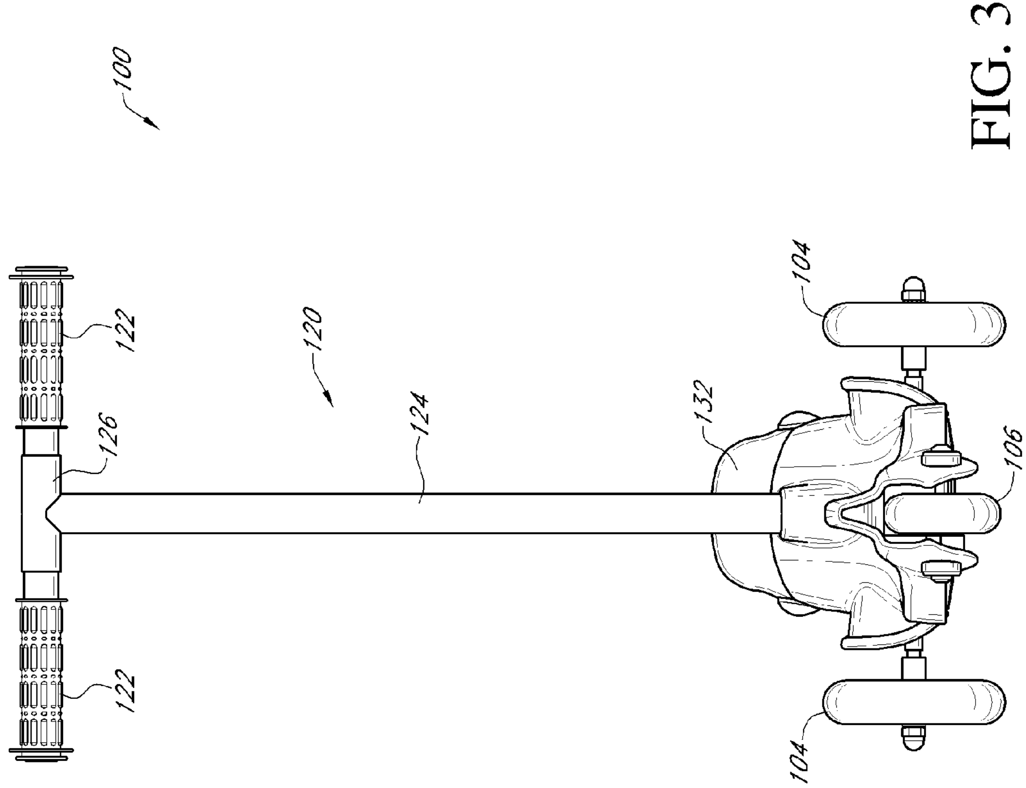
FIG. 3 is a rear view of the scooter of FIG. 1.
Figure 4:
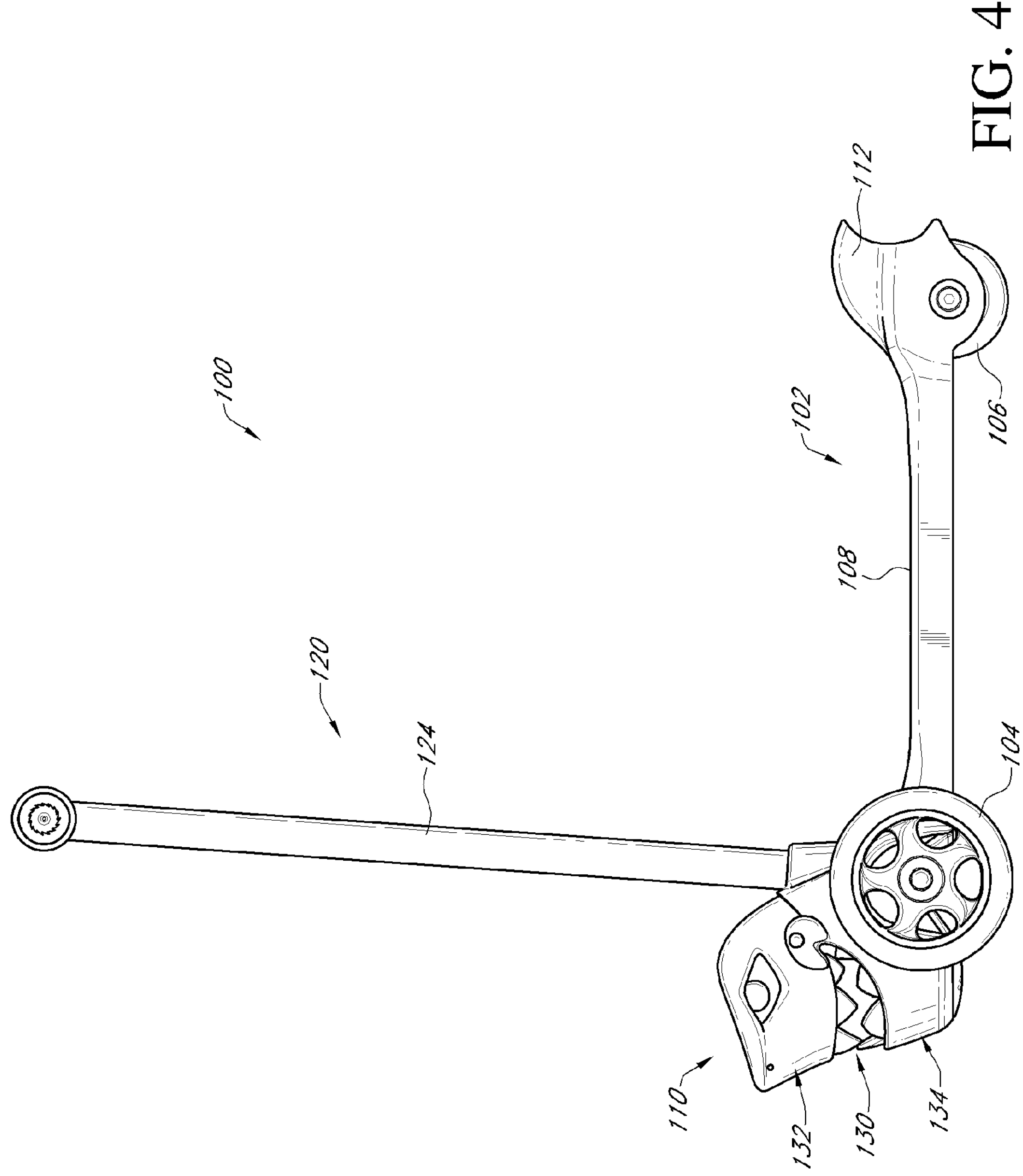
FIG. 4 is a right side view of the scooter of FIG. 1.
Figure 5:
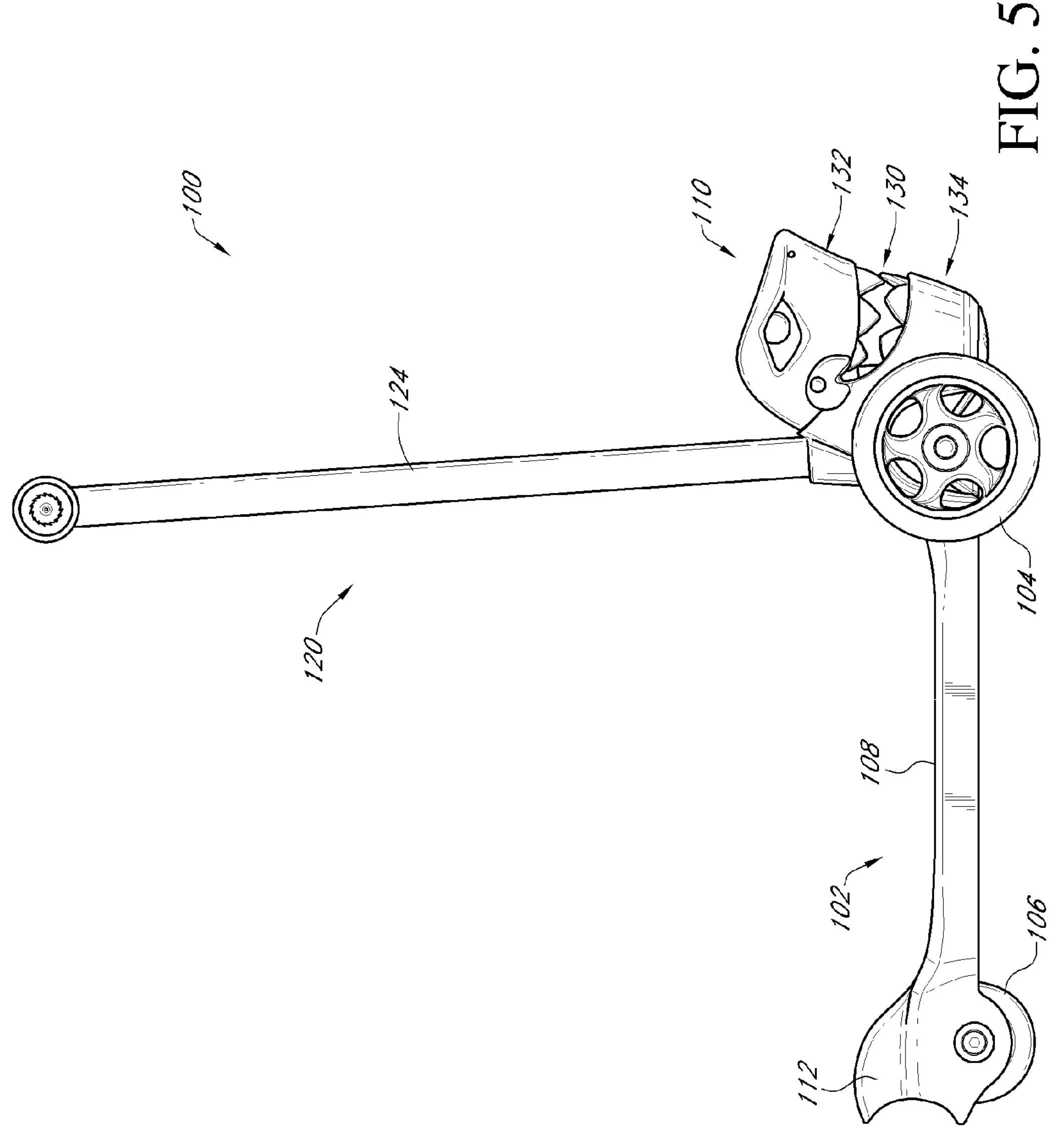
FIG. 5 is a left side view of the scooter of FIG. 1.
Figure 6:
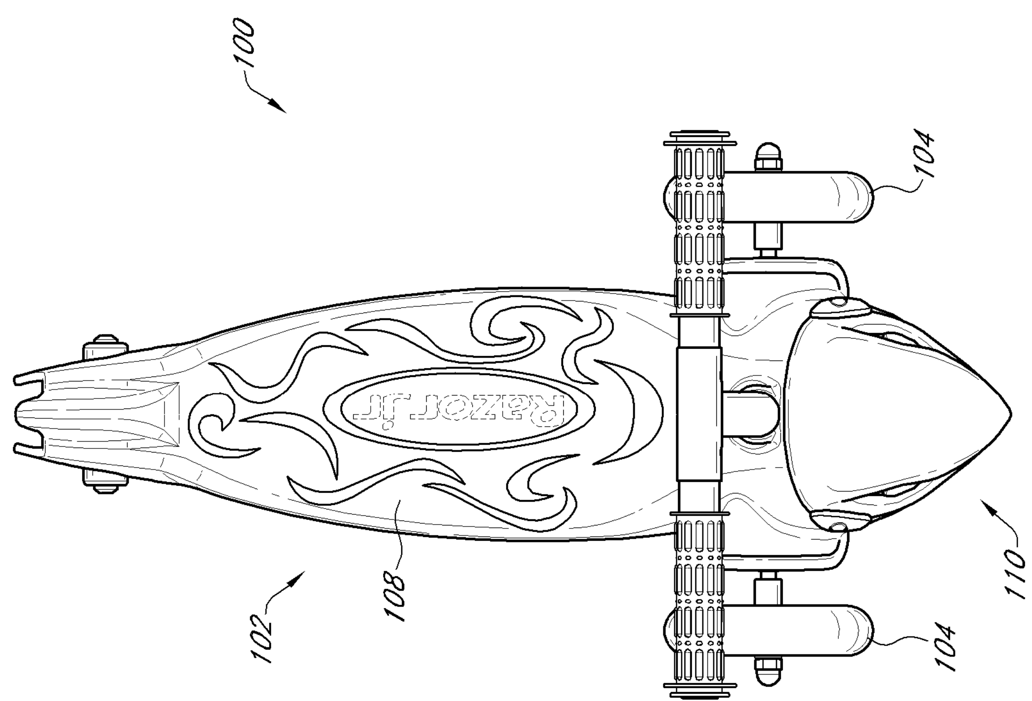
FIG. 6 is a top view of the scooter of FIG. 1.
Figure 7:
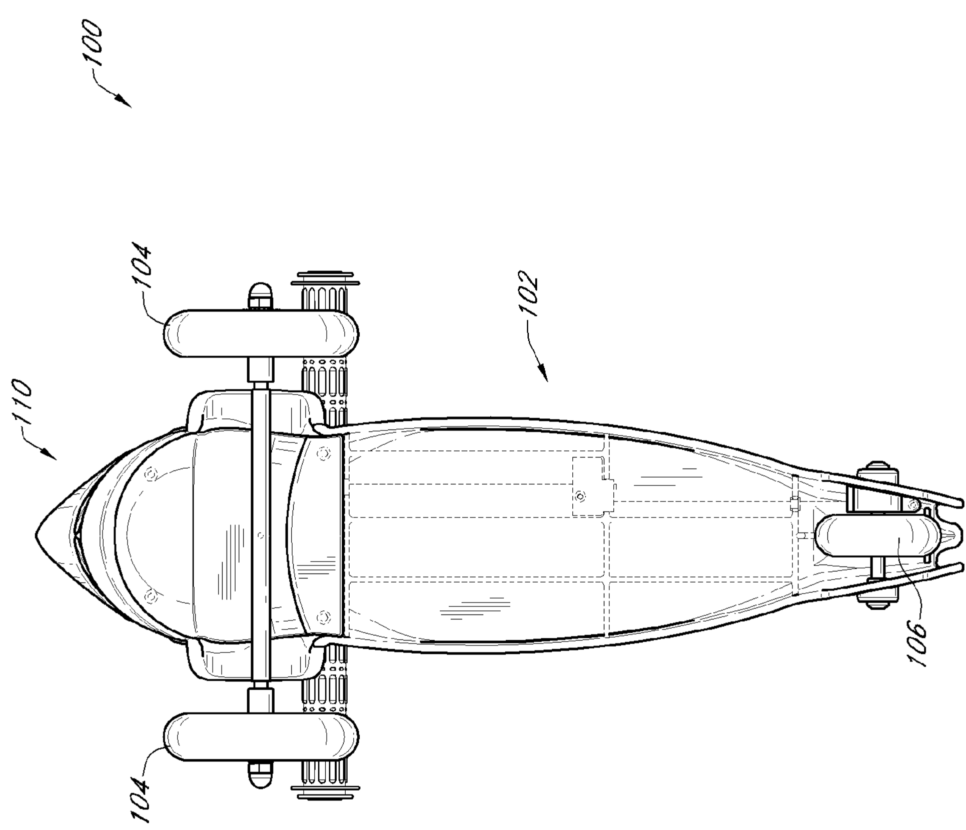
FIG. 7 is a bottom view of the scooter of FIG. 1.
Figure 8:
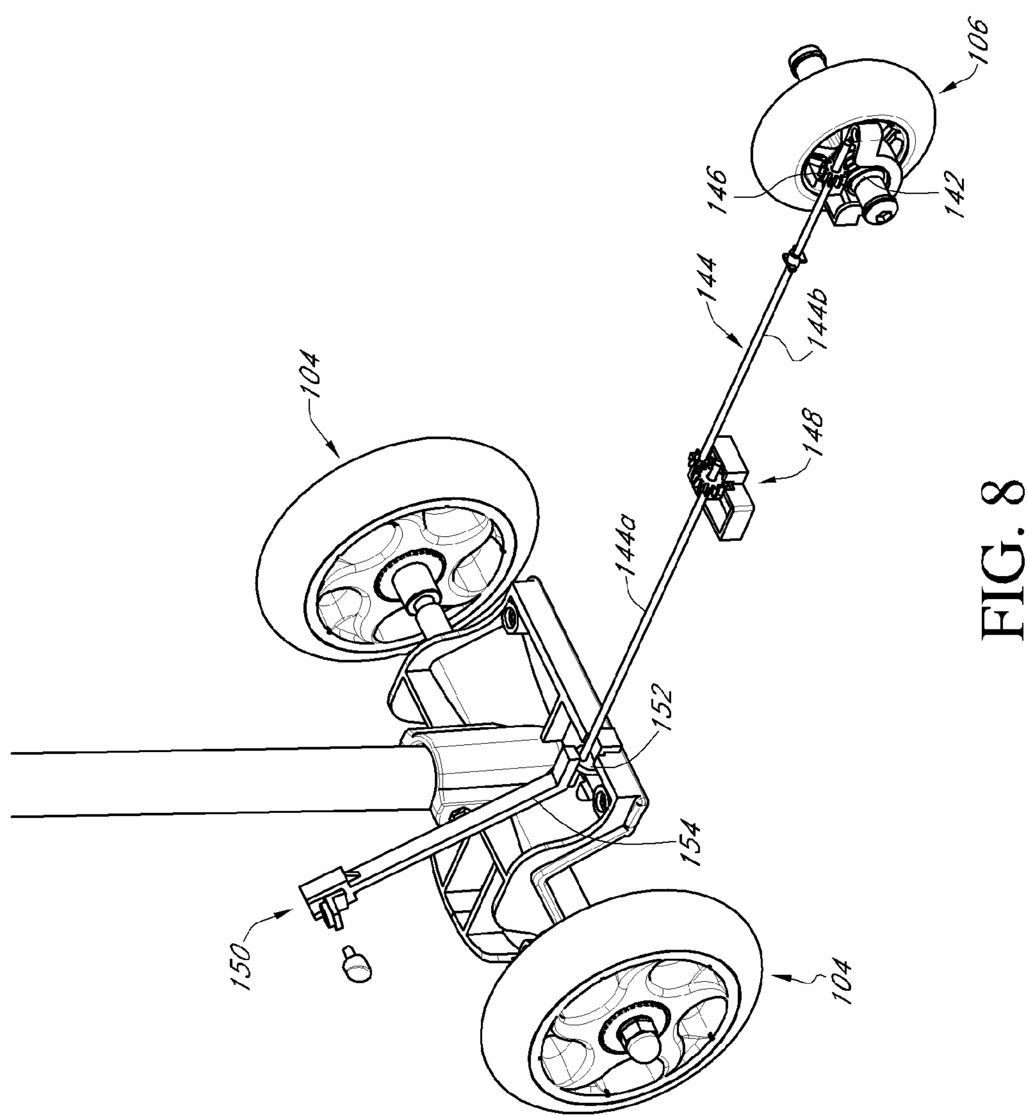
FIG. 8 is a perspective view of certain internal components of the scooter.
Figure 9:
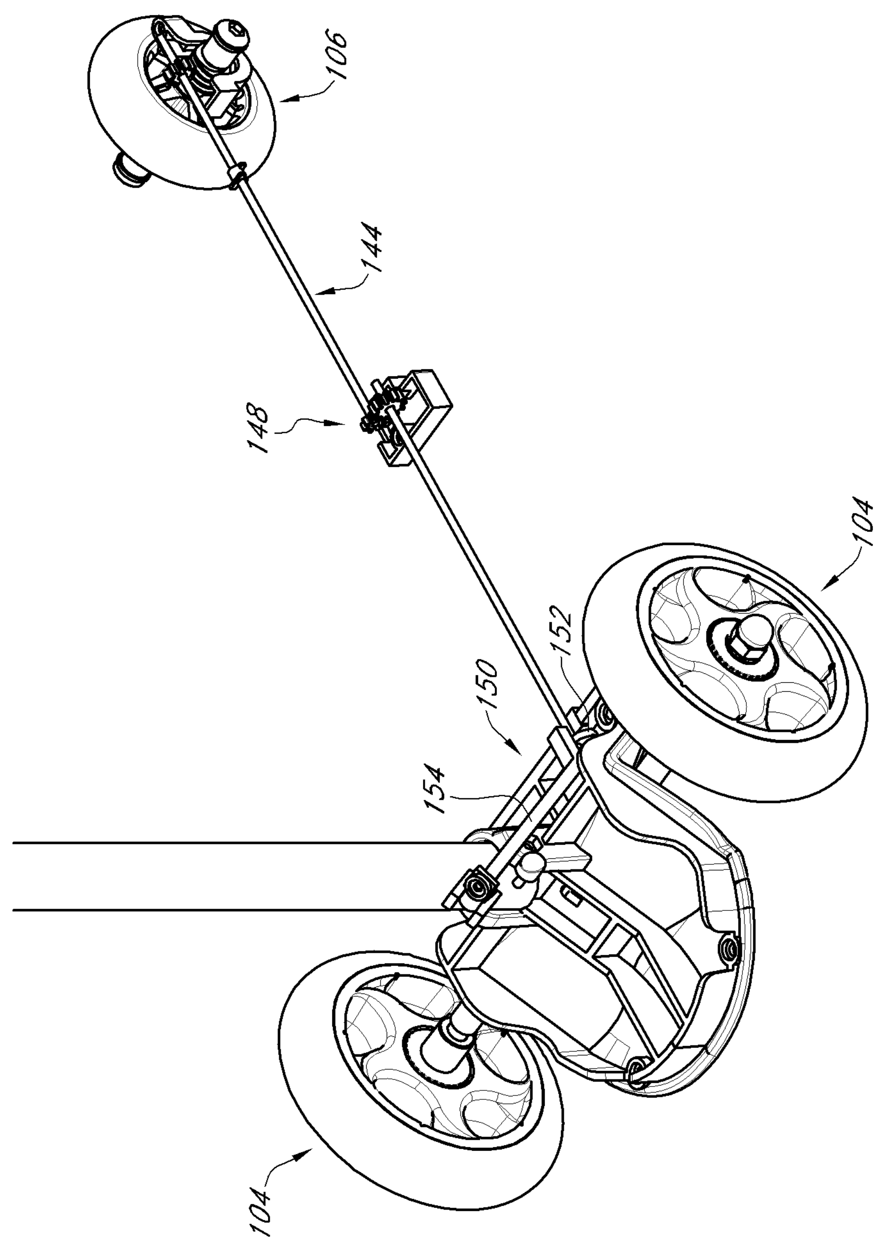
FIG. 9 is another perspective view of the internal components shown in FIG. 8.
Figure 10:
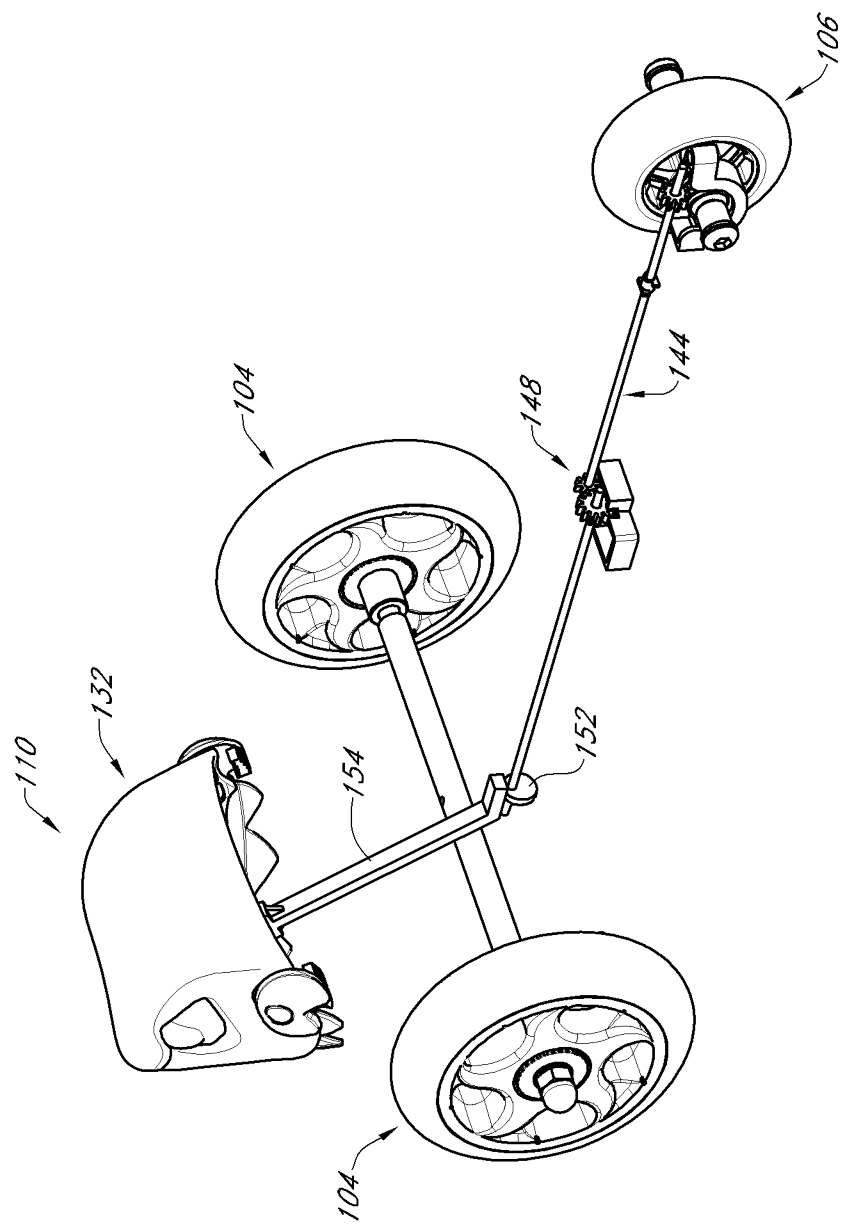
FIG. 10 is another perspective view of the internal components shown in FIG. 8 and also showing a movable portion of the scooter.

Embodiments of systems, components and methods of assembly and manufacture will now be described with reference to the accompanying figures, wherein like numerals refer to like or similar elements throughout. Although several embodiments, examples and illustrations are disclosed below, it will be understood by those of ordinary skill in the art that the inventions described herein extends beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and other similar words.

Particular features of the vehicle (e.g., scooter) are described with reference to FIGS. 1-14. The scooter of FIGS. 1-7 can be substantially similar or identical to the scooter of FIGS. 8-13, or can be of another suitable arrangement. As mentioned above, the figures and description are illustrative only and are not intended to be limiting.

FIGS. 1-7 illustrate multiple views of a personal mobility vehicle in the form of a scooter. The illustrated scooter has a movable portion. The movable portion moves in response to rolling movement of the scooter along a surface. In some configurations, the movable portion comprises a portion of a character that is formed by the scooter body. In the illustrated arrangement, the movable portion is a portion of a head of the character, such as an upper portion of the head including the upper portion of a mouth of the character. In some configurations, the movable portion could be a lower portion of the head including the lower portion of the mouth. In various arrangements, the movable portion can provide the appearance of the character moving, such as the appearance of the character opening and closing its mouth. A pivot axis for the movable portion can pass through locations at or near rearward ends of the mouth of the character.

As shown in FIGS. 1-7, the scooter 100 comprises a body 102 that is supported for rolling movement on a surface by one or more wheels. In the illustrated arrangement, the scooter 100 comprises front and rear wheels 104, 106. In particular, the scooter 100 includes a pair of laterally-spaced front wheels 104 and a single, centrally-located rear wheel 106. However, in other arrangements, single front and rear wheels or a single front and a pair of rear wheels could be provided, among other possible arrangements. The front wheels 104 can be steerable wheels that provide for steering of the scooter 100. The wheels 104 can be supported by an axle that is rotatable about a steering axis. In some configurations, the scooter 100 can comprise a leaning-type steering arrangement, such as any of the types disclosed in U.S. Pat. No. 8,186,693 entitled TRANSPORTATION DEVICE WITH PIVOTING AXLE, the entirety of which is incorporated by reference herein.

The illustrated body 102 comprises a deck 108 extending between the wheels 104, 106 that provides a support surface for a user of the scooter 100 to place his or her feet. The body 102 also comprises a portion that is sculpted into the shape of a character. As described above, the portion can comprise a head of a character, such as a shark head in the illustrated arrangement. The character head 110 can be positioned at or near the front of the scooter 100, such as generally at or forward of the front wheels 104. Additional portions of the scooter 100 can form other portions of the character, such as the deck 108, for example. In the illustrated arrangement, a rear fender 112 of the rear wheel 106 can be in the form of a shark fin, for example. As used herein, the term "character" can include people, animals, imaginary beings, personified objects, cartoon characters, monsters, robots and other creatures. The scooter 100 can also include a body portion sculpted to resemble other objects, which can include a movable portion.

The scooter 100 can also comprise a steering mechanism, such as a handlebar assembly 120. The handlebar assembly 120 can include a pair of handgrip portions comprising handgrips 122. The handlebar assembly 120 can comprise a generally vertical support bar 124 that extends upwardly from a forward portion of the scooter body 102 and a horizontal bar 126 at or near an upper end of the vertical support bar 124. The handgrip portions comprising the handgrips 122 can be defined by or carried by the horizontal bar 126. In other arrangements, the steering mechanism can be omitted and the scooter 100 can be in the form of a skateboard, for example.

The character head 110 can comprise a mouth 130. As used herein, the term "mouth" has its plain and ordinary meaning, such as an opening or entrance to a structure that is hollow, concave, or almost completely enclosed. Unless otherwise stated, the term "mouth" is not limited to anatomical mouth structures and can include different types of structures. For example, the term "mouth" can include eyes or other openings or features.

As illustrated, the head 110 can include an upper portion 132 and a lower portion 134. In some embodiments, the upper portion 132 is above the mouth 130 and the lower portion 134 is below the mouth 130. The mouth 130 can define a separation between the upper portion 132 and the lower portion 134. An upper portion of the mouth 130 (e.g., including upper teeth) can form a portion or otherwise be carried by the upper portion 132. A lower portion of the mouth 130 (e.g., including lower teeth) can form a portion or otherwise be carried by the lower portion 134. In some configurations, the movable portion comprises the upper portion 132. In some configurations, the movable portion comprises the upper portion 132 and not the lower portion 134. In some configurations, the movable portion comprises the lower portion 134. In some configurations, the movable portion comprises the lower portion 134 and not the upper portion 132. In some configurations, the movable portion comprises both the upper portion 132 and the lower portion 134. Movement of the movable portion(s) can provide the appearance of the character head 110 opening or closing its mouth. In some configurations, the movable portion(s) can provide the appearance of other types of movement of a character or other object, such as other portions of the character head or face (e.g., eyes, tongue), character limbs (e.g., arms, legs) or other portions/objects.

With reference to FIG. 1, in the illustrated arrangement, the upper portion 132 of the character head 110 above the mouth 130 moves relative to the lower portion 134 below the mouth 130. The upper portion 132 pivots about a pivot axis 136 that extend through locations or points at or near rearward ends of the mouth 130. Alternatively, the upper portion 132 could move in a reciprocating fashion, any other suitable type of movement or combinations thereof.

As shown in FIGS. 8-11, the movement of the movable portion can be driven by the rolling movement of one or more of the wheels 104, 106. In the illustrated arrangement, the movement is driven by the non-steering or rear wheel 106, such that the overall structure is simplified. A motion transfer mechanism 140 transfers motion of the wheel (e.g., rear wheel 106) to the movable portion (e.g., upper portion 132 of the character head 110). The motion transfer mechanism 140 can comprise a gear, such as a worm gear 142, on the rear wheel 106, which drives a drive shaft 144 via a gear, such as a spur gear 146, which is engaged with the worm gear 142. Although not specifically illustrated, the drive shaft 144 can be supported by the body 102 of the scooter 100, including the deck 108, for example. The drive shaft 144 can be divided into two portions **144*a*, 144*b*, which can be rotatably coupled by a transmission 148. The transmission 148 can comprise two or more gears that transfer rotational motion between the drive shaft portions 144*a*, 144*b*. The transmission 148 can transfer motion at the same rotational speed/velocity or can provide a ratio that is other than a 1:1 ratio to change the rotational speed/velocity between the drive shaft portions 144*a*, 144*b*. In the illustrated arrangement, the transmission 148 is arranged to provide the driven or forward drive shaft portion 144*a* with a slower rotational velocity than the drive or rearward drive shaft portion 144*b***.

A motion conversion mechanism 150 can convert rotational movement of the drive shaft 144 into suitable motion for the specific movable portion, such as linear, translating or reciprocating movement, for example. In the illustrated arrangement, the motion conversion mechanism 150 comprises a cam 152 driven by the drive shaft 144 and a cam follower or push rod 154 driven by the cam 152. The push rod 154 is directly or indirectly connected to the movable portion to impart movement on the movable portion. The push rod 154 can be supported for reciprocating motion. In other arrangements, the push rod 154 could be supported for pivotal or rotational movement. The push rod 154 or the movable portion could comprise a biasing arrangement incorporating a biasing mechanism (e.g., spring) that biases the push rod 154 or movable portion toward a relaxed position. The cam 152 or other motion conversion mechanism 150 can move the push rod 154 or movable portion against the biasing force of the biasing mechanism. The movable portion can be constrained for movement with the push rod 154. In other configurations, the movable portion can be free to move in at least one direction relative to the push rod 154. For example, the push rod 154 could be configured to push the movable portion in an upward direction, but does not pull the movable portion in a downward direction. The movable portion can move downwardly with the push rod 154 under the influence of gravity or a biasing mechanism. Other suitable motion conversion mechanisms could also be used. The arrangement could comprise a clutch or other override mechanism that avoids or reduces damage to the motion transfer mechanism 140 or motion conversion mechanism 150 in the event that movement of the movable portion is constrained (e.g., by an external force) while a driving force is applied to the movable portion.

Figure 11:
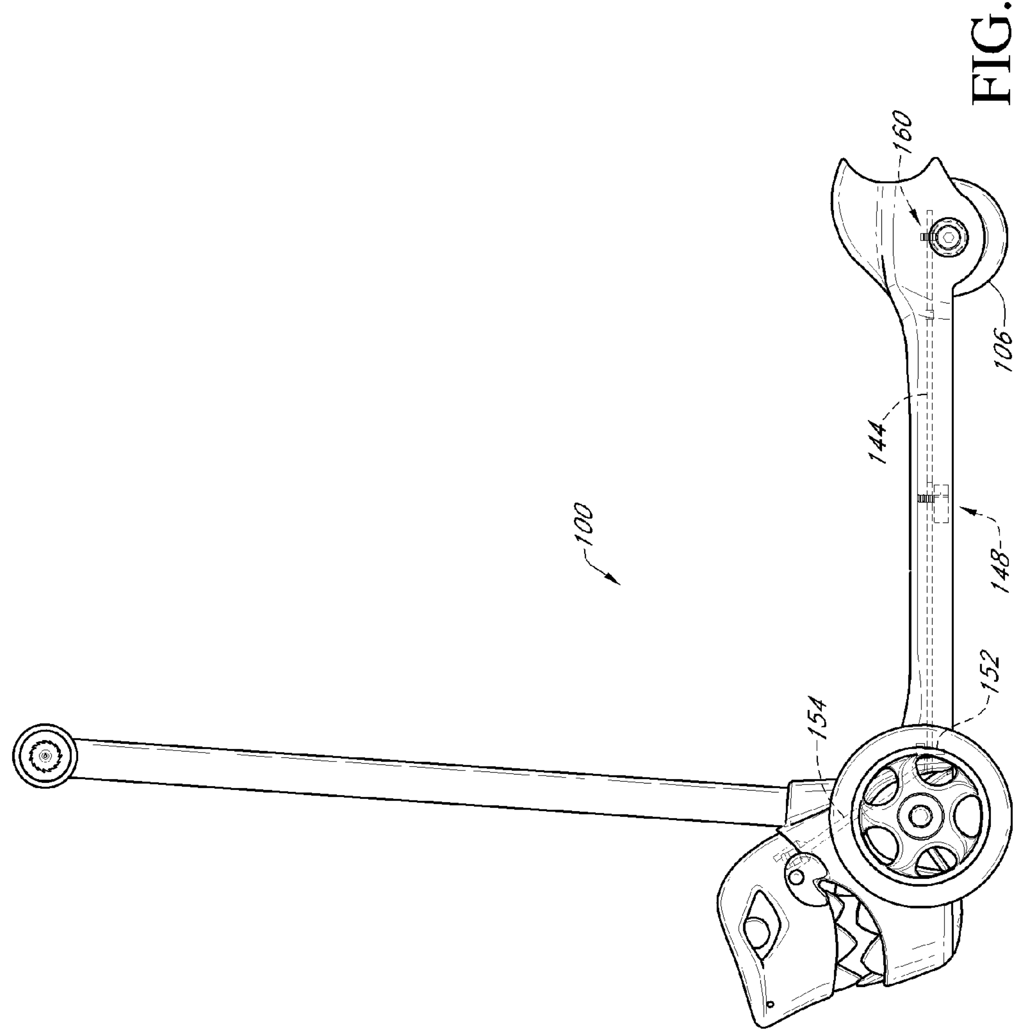
FIG. 11 is a side view of another version of the scooter.

FIG. 11 illustrates another arrangement of the scooter 100 in which the drive shaft 144 is driven by the rear wheel 106 via a bevel gear arrangement 160. The transmission 148 is located at or near a front end portion of the scooter 100. A cam 152 is driven by an output of the transmission 148 and drives a push rod 154, which in turn moves the movable portion or upper portion 132 of the character head 110. In other respects, the scooter 100 of FIG. 11 can be the same as or substantially similar to the scooter 100 of FIGS. 1-10.

Figure 12:
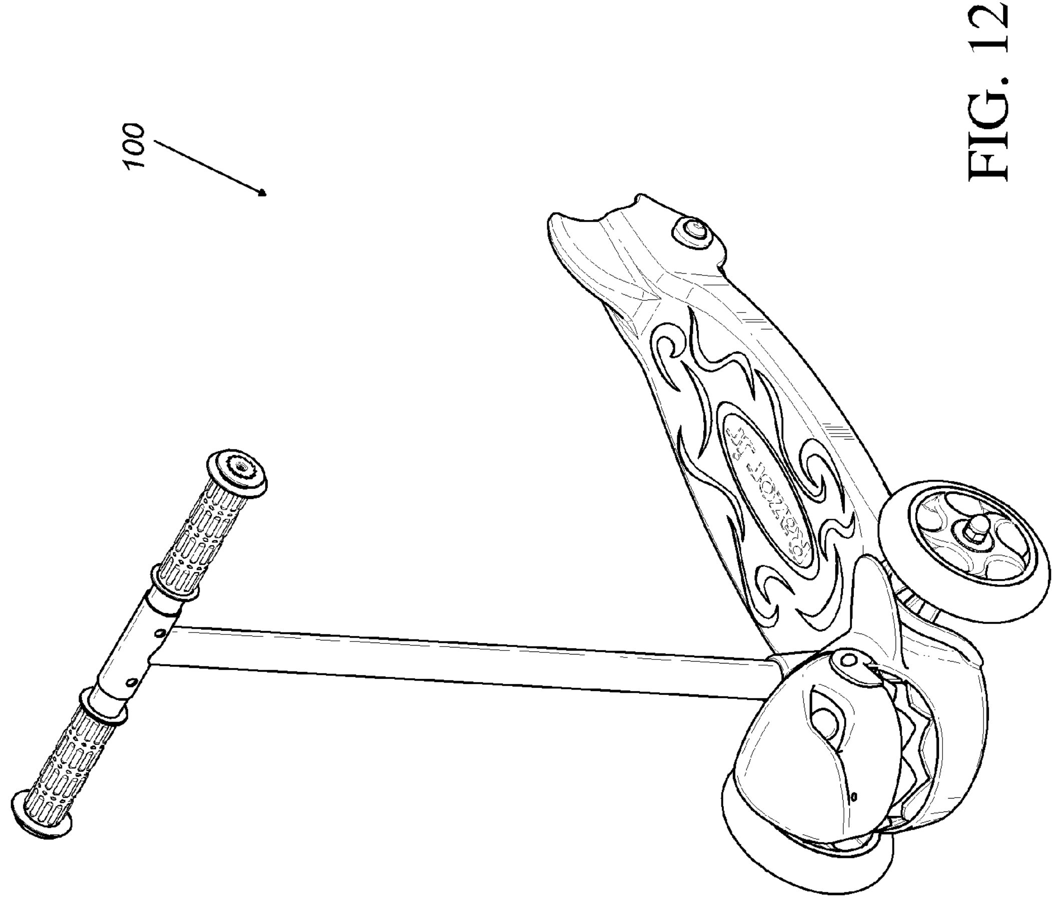
FIG. 12 is a perspective view of another version of the scooter.

FIG. 12 illustrates another embodiment of a scooter 100. In some embodiments, including the illustrated embodiment, additional features may be added to the character head, such as fins, wings, etc.

Figure 13:
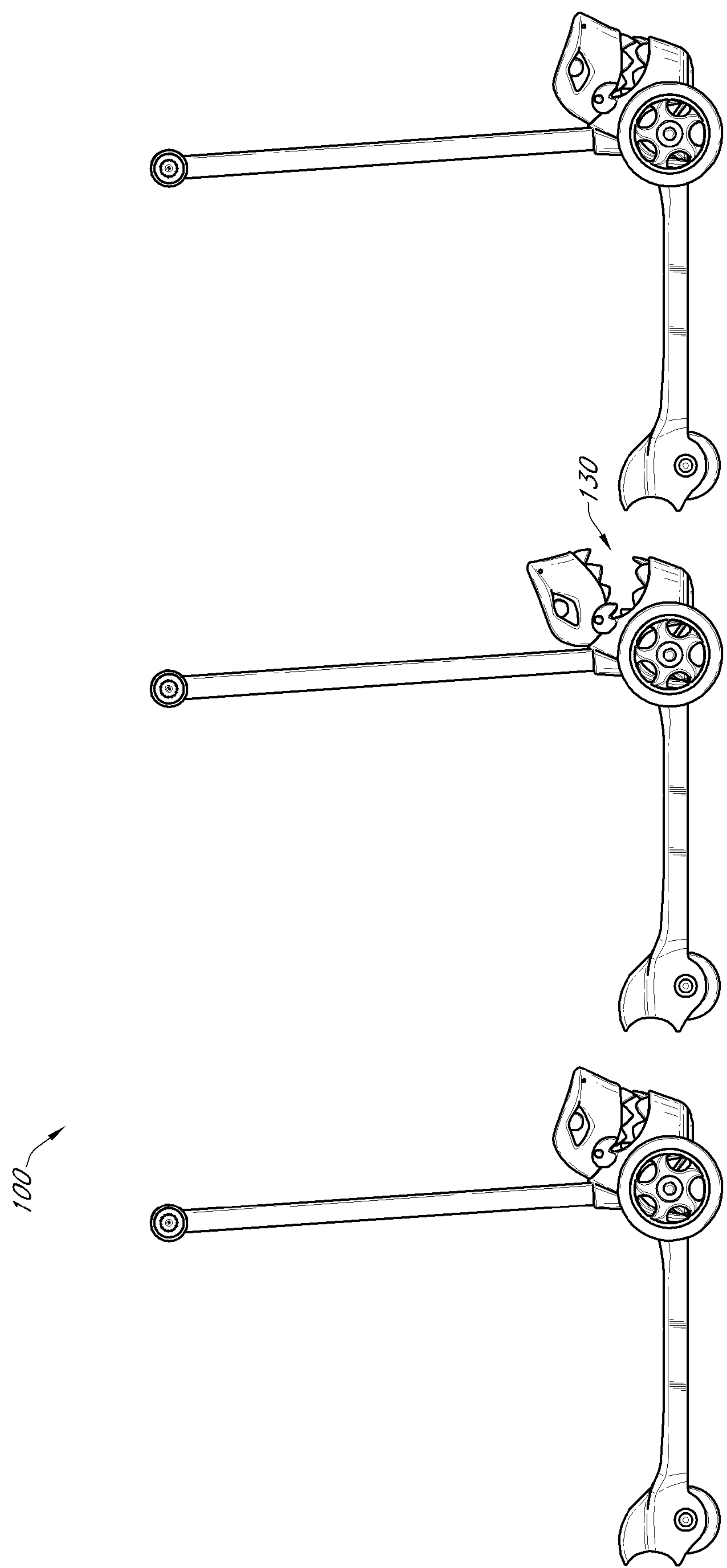
FIG. 13 illustrates a series of views of the scooter illustrating movement of the movable portion.

FIG. 13 illustrates movement of the movable portion of the scooter 100 through a series of side views of the scooter 100 moving along a surface. Discrete positions of the movable portion are illustrated. However, the movement of the movable portion can be continuous between the illustrated positions, including relatively smooth movement between such positions. As illustrated in FIG. 13, the movable portion can move between first and second directions, such as in a first direction and then in an opposite direction (e.g., toward a closed position then toward an open position). In some configurations, the movable portion may move in a first (e.g., clockwise) direction and then in a second (e.g., counter-clockwise) direction, or vice versa. In some embodiments, the movable portion alternates (e.g., toggles) between moving in the first direction and the second direction. As discussed above with respect to FIGS. 1-7, the movable portion may be the upper portion, the lower portion, or both the upper and lower portions. In some embodiments, during movement in the first direction and/or second direction, the movable portion pivots at least about: 20°, 40°, 60°, 80°, 90°, 100°, values between the aforementioned values, or other values. In some implementations, the movable portion moves (e.g., pivots) a sufficient amount to substantially close the mouth 130 (e.g., to bring upper and lower lips of the mouth near or into abutment with each other). In some variants, the movable portion does not move (e.g., pivot) a sufficient amount to substantially close the mouth 130.

In some embodiments, during movement of the scooter on the wheels, the movable portion moves substantially independent of any action by the user or rider and/or the movable portion moves substantially automatically. For example, in some embodiments, motion of the movable portion, such as opening and closing the mouth as shown in FIG. 13, does not require additional input or actions by the user when the scooter is moving. This may be beneficial at least because the user can concentrate on riding without needing to concurrently operate an actuator (e.g., a hand lever or other mechanical control) to operate the movable portion. In some embodiments, the rate at which the movable portion moves depends (e.g., linearly or non-linearly) upon the rate of speed of the scooter. For example, the speed (e.g., rotational speed) of the movable portion can increase as the speed (e.g., speed along the ground) of the scooter increases, and/or the speed of the movable portion can decrease as the speed of the scooter decreases. In some implementations, the scooter is configured (e.g., through gearing) to multiply or reduce the speed of one or more of the wheels, such that the movable portion moves more rapidly or more slowly than the wheels.

CONCLUSION

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The terms "approximately," "about," and "substantially" mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. The term "generally" as used herein represents a value, amount, or characteristic that predominantly includes, or tends toward, a particular value, amount, or characteristic. As an example, in certain embodiments, as the context may dictate, the term "generally parallel" can refer to something that departs from exactly parallel by less than or equal to 20 degrees and/or the term "generally perpendicular" can refer to something that departs from exactly perpendicular by less than or equal to 20 degrees.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Furthermore, where the terms "and" and "or" are used in conjunction with a list of items, they are to be interpreted broadly, in that any one or more of the listed items may be used alone or in combination with other listed items. The term "alternatively" refers to the selection of one of two or more alternatives, and is not intended to limit the selection to only those listed alternatives or to only one of the listed alternatives at a time, unless the context clearly indicates otherwise.

Some embodiments have been described in connection with the accompanying drawings. The figures are drawn to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

Overall, the language of the claims is to be interpreted broadly based on the language employed in the claims. The claims are not to be limited to the non-exclusive embodiments and examples that are illustrated and described in this disclosure, or that are discussed during the prosecution of the application. Rather, the claims should be interpreted by a fair reading of the language of the claims as well as by a consideration of the full scope of equivalents.

What is claimed is:

1. A scooter configured to be ridden by a human user, the scooter comprising:

a body having:

a central longitudinal axis;

a footboard comprising lateral siderails;

a rear portion; and a front portion comprising a movable portion, wherein the footboard extends longitudinally between the front portion and the rear portion of the body;

the movable portion comprising a upper portion, a lower portion, and an opening therebetween, the upper portion hingeably connected to the lower portion such that the upper portion is movable relative to the lower portion;

a handlebar assembly operably coupled to the body, the handlebar assembly comprising a vertical member extending upward relative to the footboard and a handlebar connected with the vertical member, the handlebar including grip portions that are accessible to the user riding on the scooter;

a plurality of wheels connected with the body, wherein at least one wheel of the plurality of wheels is positioned approximately on the central longitudinal axis of the body such that the at least one wheel is laterally centrally located in the scooter; and a motion transfer mechanism that transfers motion from one or more of the plurality of wheels to the movable portion.

2. The scooter of claim 1, wherein the motion transfer mechanism comprises a drive shaft and a motion conversion mechanism configured to convert rotational motion of the drive shaft into suitable motion to move the upper portion of the movable portion.

3. The scooter of claim 2, wherein the motion conversion mechanism comprises a cam and a push rod.

4. The scooter of claim 3, wherein the motion transfer mechanism further comprises a transmission.

5. The scooter of claim 1, wherein the upper portion of the movable portion comprises a first portion of a character head, the lower portion of the movable portion comprises a second portion of the character head, and the opening comprises a mouth of the character head.

6. A scooter configured to be ridden by a human user, the scooter comprising:

a body, the body comprising:

a movable front portion comprising an upper portion and a lower portion connected at a pivot, the upper portion comprising an upper part of a character mouth and a character eye, the lower portion comprising a lower part of a character mouth, the upper portion configured to move relative to the lower portion, a rear portion, and a footboard, the footboard configured to receive and support a standing human user, the footboard extending longitudinally between the movable front portion and the rear portion of the body;

a plurality of wheels connected with the body, the plurality of wheels comprising a front wheel and a rear wheel, the front and rear wheels each configured to rotate; and a motion transfer mechanism that transfers motion from one or more of the plurality of wheels to the movable front portion, wherein the pivot of the movable portion is positioned longitudinally forward of an axis of rotation of the front wheel.

7. The scooter of claim 6, wherein the motion transfer mechanism comprises a drive shaft and a motion conversion mechanism, the motion conversion mechanism configured to convert rotational motion of the drive shaft into suitable motion to move the movable portion.

8. The scooter of claim 7, wherein the motion conversion mechanism comprises a cam and push rod.

9. The scooter of claim 7, wherein the motion conversion mechanism further comprises a transmission.

10. The scooter of claim 7, wherein the suitable motion to move the movable portion comprises pivotal motion to partially pivot the movable portion about a pivot axis.

11. The scooter of claim 6, wherein the body comprises a character head and the movable portion comprises a portion of the character head.

12. The scooter of claim 11, wherein the portion of the character head comprises an upper portion of the character head.

13. The scooter of claim 12, wherein the upper portion of the character head is above a mouth of the character head.

14. The scooter of claim 13, wherein the portion of the character head does not comprise a lower portion of the character head below the mouth.

15. The scooter of claim 13, wherein the portion of the character head moves about a pivot axis that passes through or near a rearward end of the mouth.

16. A scooter configured to be ridden by a human user, the scooter comprising:

a body comprising:

a central longitudinal axis;

a footboard comprising lateral siderails, a front portion comprising a movable portion; and a rear portion, wherein the footboard extends longitudinally between the front portion and the rear portion of the body;

a front wheel rotatably connected with the front portion of the body;

a rear wheel rotatably connected with the rear portion of the body;

a handlebar assembly connected with the front portion of the body, the handlebar assembly including a handlebar connected with a vertical tube; and a motion transfer mechanism comprising a drive shaft configured to transfer motion from the rear wheel to the movable portion, wherein at least one of the front wheel or the rear wheel is positioned approximately on the central longitudinal axis of the body such that the at least one wheel is laterally centrally located in the scooter, and wherein the body comprises a character head, and the movable portion comprises at least one of an upper portion and a lower portion of the character head.

17. The scooter of claim 16, wherein the upper portion comprises an upper lip of a mouth of the character head and the lower portion comprises a lower lip of the mouth of the character head.

18. The scooter of claim 16, wherein the motion transfer mechanism further comprises a motion conversion mechanism configured to convert rotational motion of the drive shaft into motion of the upper portion of the character head.

19. The scooter of claim 18, wherein the motion of the upper portion of the character head alternates between motion in a first direction and motion in a second direction.

20. The scooter of claim 16, wherein the movable portion of the character head moves about a pivot axis that passes through or near a rearward end of the character head.

21. The scooter of claim 16, further comprising a plurality of front wheels.

* * * * *